United States Patent [19]

Matsudaira et al.

[11] 3,985,698

[45] Oct. 12, 1976

[54] METHOD FOR IMPROVING EMULSION PAINT BY ADDING AN ACRYLIC RESIN PRODUCED FROM A TERTIARY AMINE CONTAINING ETHYLENICALLY UNSATURATED MONOMER

[75] Inventors: Tadashi Matsudaira; Tadashi Watanabe; Yashuhiko Haruta; Teiitsu Takagi, all of Hiratsuka, Japan

[73] Assignee: Kansai Paint Company, Ltd., Japan

[22] Filed: Feb. 24, 1975

[21] Appl. No.: 552,201

[30] Foreign Application Priority Data

Feb. 26, 1974 Japan.................................. 49-21900

[52] U.S. Cl................. 260/29.6 TA; 260/29.6 HN; 260/29.6 RW; 260/29.7 W
[51] Int. Cl.$^2$......................................... C08L 33/00
[58] Field of Search............ 260/29.6 HN, 29.6 RW, 260/29.6 TA, 29.7 W

[56] References Cited
UNITED STATES PATENTS

| | | | |
|---|---|---|---|
| 3,245,932 | 4/1966 | Glavis et al.................. | 260/29.6 TA |
| 3,728,295 | 4/1973 | Skinner....................... | 260/29.6 TA |
| 3,853,803 | 12/1974 | Anderson et al............ | 260/29.6 TA |

*Primary Examiner*—M. J. Welsh
*Attorney, Agent, or Firm*—Ostrolenk, Faber Gerb & Soffen

[57] ABSTRACT

A method for improving emulsion paint which is characterized in that 1 to 40 parts by weight as solids of aqueous acrylic resin solution is added to 100 parts by weight as resin solids of emulsion paint, said aqueous acrylic resin solution being produced from ethylenically unsaturated monomer having tertiary amine group, ethylenically unsaturated monomer having carboxyl group(s) and other ethylenically unsaturated monomer. The improved emulsion paint thereby formed has a low thixotropic property and an excellent coating property, and forms excellent coating film with good water resistance, moisture resistance and chemical resistance.

9 Claims, No Drawings

METHOD FOR IMPROVING EMULSION PAINT BY ADDING AN ACRYLIC RESIN PRODUCED FROM A TERTIARY AMINE CONTAINING ETHYLENICALLY UNSATURATED MONOMER

BACKGROUND OF THE INVENTION

This invention relates to a method for improving emulsion paint. More particularly, the invention relates to a method for improving the coating property and the storage stability of emulsion paint.

The emulsion paints have been used as indoor and outdoor wall paints and so forth, and the paints of this type have come into notice because they have several advantages that, as compared with the ordinary organic solvent type, the organic solvents can be saved, evaporation of the organic solvent vapor in drying step is little and air pollution is therefore little. However, the coating property and the storage stability of the emulsion paint are somewhat inferior to those of the organic solvent types, so that the utility of the emulsion paint could not be wide enough for baking type paint.

The emulsion paints are dispersions mainly containing emulsified resins and pigments, and therefore the emulsion paints have a high thixotropic property and the viscosity is liable to become low. As a result, the painted film has the disadvantages that the flowing property is poor and the desired film thickness is unobtainable. In order to give a good coating property to the emulsion paint, the thixotropic property of the emulsion paint must be made low and the viscosity of the emulsion point is to be regulated within a proper range, for example, about 60 to 100 seconds No.4 Ford. cup at 25° C, and for this purpose, there are well known the following two methods.

One method is to add a small amount of high molecular water soluble resins to the emulsion paint, and as such resins, methyl cellulose, carboxymethyl cellulose, polyacrylamide, sodium polyacrylate and the like are widely used. According to this method, the viscosity of the emulsion paint can be surely increased, however, there is no effect for lowering of the thixotropic property of the paint, and what is worse, the water resistance of the dried paint film is decreased due to the addition of the water soluble resin.

The other method is to add a small amount (0.1 to 1 part by weight to 100 parts by weight of paint composition) of some surface active agents such as anionic, cationic, nonionic or ampholytic surface active agents to the emulsion paint. The thixotropic property can be reduced by means of this method, however, this method also has a disadvantage that the water resistance, moisture resistance and chemical resistance of the coated film are made worse. Therefore, lowering of practical properties of the paint film can not be avoided through the above-mentioned conventional two methods.

BRIEF SUMMARY OF THE INVENTION

Accordingly, it is an object of the present invention to provide improved emulsion paint which is free from the above-mentioned disadvantages.

Another object of the present invention is to provide a method for improving the properties of emulsion paint.

A further object of the present invention is to provide a method for producing an improved emulsion paint which has a low thixotropic property and excellent coating property.

A still further object of the present invention is to provide a method for producing improved emulsion paint which forms excellent paint film having good water resistance, moisture resistance and chemical resistance.

Pursuant to the above objects, the inventors have carried out eager and extensive studies on emulsion paints, and as the result, have found a method for improving emulsion paint. According to the invention, a water soluble acrylic resin having tertiary amine groups is added to the ordinary emulsion paint, in which the ratio of addition of the acrylic resin is 1 to 40 parts by weight as solid, to 100 parts by weight as resin solid of the emulsion paint. The thus prepared composition has good properties in that the thixotropic property is low, the separation and settling of pigments are little and the coating property is good. Further, it has been understood that the emulsion paint of the present invention forms excellent dried film having good water resistance, moisture resistance and chemical resistance as compared with the ordinary emulsion paint without the addition of the above-mentioned acrylic resin having tertiary amine group.

The nature, principle and detail of the present invention will be more clearly apparent from the following detailed description.

DETAILED DESCRIPTION OF THE INVENTION

The emulsion paints used for the present invention may be any of the conventional ones, for example, acrylic resin type, polyvinyl, acetate type, styrene-butadiene copolymer type and fluororesin type can be used. The effect of the present invention is especially realized in the case of a baking type emulsion paint prepared by using acrylic resin type emulsion paint.

The water soluble acrylic resin having tertiary amine groups used in the present invention is a polymer of: 1 to 20% by weight of one member or a mixture of ethylenically unsaturated monomers having tertiary amine group such as N,N-dimethylaminoethylmethacrylate, N,N-dimethylaminoethylacrylate, N,N-diethylaminoethylmethacrylate and N,N-diethylaminoethylacrylate; 5 to 20% by weight of one member or a mixture of ethylenically unsaturated monomers containing carboxyl group(s) such as acrylic acid, methacrylic acid and itaconic acid; and 60 to 94% by weight of one member or a mixture of other ethylenically unsaturated monomers such as acrylic or methacrylic esters having the following general formula:

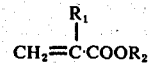

in which $R_1$ is hydrogen or methyl group and $R_2$ is alkyl group having 1 to 11 carbon atoms, hydroxyethylmethacrylate, hydroxyethylacrylate, hydroxypropylmethacrylate, hydroxypropylacrylate, acrylamide, N-methylolacrylamide, N-methylolmethacrylamide, butyl-etherified N-methylolacrylamide, and styrene. When monomers having functional groups such as hydroxyl group and methylol group are used as the above-mentioned ethylenically unsaturated monomers, a thermosetting property is imparted to the acrylic polymer, therefore such an acrylic polymer can be used for the baking type emulsion paints. Further, the thermosetting property may be enhanced by using water soluble melamine resins such as methylol melamine and methoxymethylol melamine together.

In the preparation of the aqueous solution of acrylic resin, the acrylic resin is firstly prepared by conventional solution polymerization from the above-mentioned materials, the polymerization product is then neutralized by the known method using amine, ammonia, sodium hydroxide or potassium hydroxide, and further it is dissolved in water or water containing an amount of less than 10 weight percent based on water of hydrophilic organic solvent to obtain about 10 to 50% aqueous solution. This solution is added to the emulsion paint.

The compounding ratio of the aqueous solution of acrylic resin (as solid) to the emulsion paint is 1 to 40 parts by weight, preferably 5 to 25 parts by weight, to 100 parts by weight of the emulsion paint (as resin solid). When the compounding ratio is less than 1 part by weight, the thixotropic property is not effectively reduced, while when the ratio is more than 40 parts by weight, the physical properties, such as flexibility and adhesion, of the dried film obtained from the emulsion paint become inferior.

In order to prepare the improved emulsion paint of the present invention, the emulsion and pigments, and if necessary the water soluble amino resin are first fed into a ball mill to disperse the pigments, and thereafter, the aqeous solution of acrylic resin is added to the pigment dispersion. In this process, however, the pigment dispersion before the addition of the aqueous acrylic resin solution often has a high thixotropic property, so that the pigment is liable to settle. Therefore, it is preferable that the pigments are fed into the ball mill together with the aqueous solution of acrylic resin to obtain the pigment dispersion, and the emulsion is then added thereto so as to form the improved emulsion paint of the present invention.

The details of the present invention will be further explained in the following by way of examples, in which parts and % are parts by weight and % by weight unless otherwise indicated.

EXAMPLE 1

I. Preparation of Water Soluble Acrylic Resin Solution

To a four neck flask with a thermometer, a stirrer, an inert gas inlet tube and a dropping funnel was added 100 parts of butyl cellosolve. Further, 5 parts of N,N-dimethylaminoethylmethacrylate, 10 parts of acrylic acid, 35 parts of styrene, 35 parts of laurylmethacrylate, 15 parts of hydroxypropylmethacrylate and 1 part of benzoyl peroxide were fed into the dropping funnel. The flask was heated to 120° C and was kept at this temperature, and the contents of the dropping funnel were dropped into the flask for 2 hours. After the dropping, the mixture was allowed to react for a further 2 hours. Then a solution consisting of 10 parts of toluene and 1 part of benzoyl peroxide was dropped for 1 hour, and the reaction mixture was aged for a further 2 hours. After the aging, the reaction product was cooled to 110° C, and 70 parts of the volatile solvent were removed under reduced pressure. Then, 10 parts of dimethylaminoethyl alcohol and 350 parts of distilled water were added to the above solution to obtain an aqueous solution of acrylic resin. The non-volatile matter of this aqueous solution was 20% and pH was 8.0.

II. Preparation of Resin Emulsion

According to the conventional method, a resin emulsion was prepared from the following materials.

| | |
|---|---|
| Deionized water | 120 parts |
| Methylmethacrylate | 40 parts |
| n-butylacrylate | 43 parts |
| Hydroxyethylmethacrylate | 15 parts |
| Acrylic acid | 2 parts |
| Polyethylene glycol octylphenyl ether | 2 parts |
| Postassium persulfate | 0.5 parts |
| t-butyl hydroperoxide | 0.2 parts |

After the polymerization, a small amount of ammonia was added to adjust pH at 8.0. The non-volatile matter of the thus obtained resin emulsion was 45%.

III. Preparation of emulsion paint

The emulsion paint of the present invention was prepared from the following materials:

| | |
|---|---|
| Titanium dioxide | 100.0 parts |
| 20% acrylic resin aqueous solution | 37.5 parts |
| Distilled water | 12.5 parts |
| Resin emulsion obtained in Step (II), (resin content 45%) | 178.0 parts |
| Cymel 303 | 20.0 parts |

The above pigment, acrylic resin solution and distilled water were fed into a porcelain ball mill to disperse the pigment, then the resin emulsion and Cymel 303 (trademark of water soluble melamine resin made by American Cyanamid Co.) were added to this pigment dispersion.

Note: Thixotropic property is expressed in the ratio of $\eta_6$ to $\eta_{60}$. The symbols $\eta_6$ and $\eta_{60}$ are the respective values of visocity determined by Brookfield Viscometer having the speeds of 6 and 60 rpm at 25° C.

The thus prepared emulsion paint had thixotropic property of 1.2 and such good storage stability that the separation and settling of pigment were not observed after 1 month's storage.

This emulsion paint was applied by roller coating to the surface of 0.27 mm galvanized iron sheet to form a dried film of 15 microns in thickness, and baked at 280° C for 60 seconds. Various properties of the coated panel thus obtained are given in Table below.

EXAMPLE 2

I. Preparation of Aqueous Acrylic Resin Solution

Acrylic resin was prepared in like manner as the foregoing Example 1 using the following materials:

| | |
|---|---|
| N,N-dimethylaminoethylacrylate | 10 parts |
| Acrylic acid | 15 parts |
| Styrene | 35 parts |
| Laurylmethacrylate | 30 parts |
| Acrylamide | 10 parts |
| Butyl cellosolve | 100 parts |
| Benzoyl peroxide | 2 parts |
| Toluene | 10 parts |

Then, necessary amounts of dimethylaminoethyl alcohol and distilled water were added to the obtained acrylic resin to form an aqueous solution of acrylic resin having 15% non-volatile matter and pH of 8.0.

II. Preparation of Emulsion Paint

Emulsion paint was prepared in like manner as the foregoing Example 1 using the following components:

| | |
|---|---|
| Titanium dioxide | 100.0 parts |
| Above acrylic resin solution | 75.0 parts |
| Distilled water | 25.0 parts |
| E-658 (resin content: 46%)* | 222.0 parts |

*E-658 is trademark of acrylic resin emulsion made by Rohm & Haas Corp.

The thus obtained emulsion paint had a thixotropic property of 1.4, and showed such good storage stability that the separation and settling of the pigment were not observed after 1 month's storage.

The emulsion paint was applied on the surface of an aluminum plate of 0.5 mm thickness to form a dried film of 20 microns of roller coating, and it was baked at 270° C for 120 seconds. Various properties of the coated panel thus obtained are given in Table below.

EXAMPLE 3

I. Preparation of Aqueous Acrylic Resin Solution

In like manner as the foregoing Example 1, acrylic resin was prepared from the following materials:

| | |
|---|---|
| N,N-diethylaminoethylmethacrylate | 5 parts |
| Acrylic acid | 10 parts |
| N-methylolacrylamide | 15 parts |
| Methylmethacrylate | 35 parts |
| n-butylacrylate | 35 parts |
| Benzoyl peroxide | 2 parts |
| 2-ethoxy ethanol | 100 parts |
| Toluene | 10 parts |

Then, necessary amounts of ammonia and distilled water were added to the obtained acrylic resin to form an aqueous acrylic resin solution having 20% non-volatile matter and pH of 8.0.

II. Preparation of Emulsion Paint

Emulsion paint was prepared in like manner as the foregoing Example 1 using the following materials:

| | |
|---|---|
| Titanium dioxide | 100.0 parts |
| Above acrylic resin solution | 37.5 parts |
| Distilled water | 12.5 parts |
| Nicasol XD-2992A(resin content 46%)** | 250.0 parts |
| Cymel 303 | 20.0 parts |

**Nicasol XD-2992A is trademark of acrylic resin emulsion made by Nippon Carbide Industries Co., Ltd.

The thus obtained emulsion paint had a thixotropic property of 1.5, and showed such good storage stability that the separation and settling of the pigment were not observed after 1 month's storage.

The emulsion paint was applied to the surface of a galvanized iron sheet of 0.27 mm thickness to form a dried coating film of 15 microns in thickness by roller coating, and it was then baked at 280°C for 60 seconds. Various properties of the coated panel thus obtained are given in Table below.

COMPARATIVE EXAMPLE

Emulsion paint was prepared from the following materials:

| | |
|---|---|
| Titanium dioxide | 100.0 parts |
| 2% aqueous solution of methyl cellulose | 30.0 parts |
| Polyethylene glycol nonylphenyl ether | 1.0 parts |
| Sorbitan mono-oleate | 1.0 parts |
| Distilled water | 35.0 parts |
| Nicasol XD-2992A | 178.0 parts |
| Cymel 303 | 20.0 parts |

The above titanium dioxide pigment was dispersed in a porcelain ball mill using the above methyl cellulose solution, polyethylene glycol nonylphenyl ether, sorbitan monooleate and distilled water, then Nicasol XD-2992A and Cymel 303 were added to the dispersion to form the emulsion paint. The thus obtained emulsion paint had a thixotropic property of 4.

After 1 month's storage of this emulsion paint, coagulation and settling of the pigment were observed.

The above emulsion paint was applied to the surface of a galvanized iron sheet of 0.27 mm thickness to form a dried film of 15 micron thickness, and it was baked at 280° C for 60 seconds. The thus obtained coating film was not smooth because the emulsion paint had a high thixotropic property. Various properties of the coated panel obtained are given in Table below.

From the above example, it will be understood that the improved emulsion paint prepared according to the present invention is superior to the conventional emulsion paint.

It should be emphasized, however, that the specific embodiments described and shown herein are intended as merely illustrative and in no way restrictive of the invention.

Table

| Example | 1 | 2 | 3 | Comparative Example |
|---|---|---|---|---|
| Boiling water resistance | no change | no change | no change | blistering |
| Alkali resistance | '' | '' | '' | '' |
| Acid resistance | '' | '' | '' | '' |

The testing methods are as follows:

1. Boiling water resistance

After specimen was immersed in boiling water for 2 hours, the state of coating film was observed.

2. Alkali resistance

A specimen was immersed in 5% aqueous solution of sodium hydroxide at 20° C for 2 days.

3. Acid resistance

A specimen was immersed in 5% aqueous solution of sulfuric acid at 20° C for 2 days.

What is claimed is:

1. A method for improving emulsion paint which is characterized in that 1 to 40 parts by weight as solids of aqueous amine, ammonia or inorganic base solubilized acrylic resin solution is added to 100 parts by weight as resin solid of emulsion paint, said aqueous acrylic resin solution being produced from 1 to 20% by weight of at least one tertiary amine containing ethylenically unsaturated monomer selected from the group consisting of N,N-dimethylaminoethylacrylate, N,N-dimethylaminoethylmethacrylate, N,N-diethylaminoethylacrylate and N,N-diethylaminoethylmethacrylate; 5 to 20% by weight of ethylenically unsaturated monomer having at least one carboxyl group; and 60 to 94% weight of another ethylenically unsaturated monomer which is at least one member of the group of acrylic or methacrylic ester of the formula:

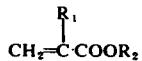

in which $R_1$ is hydrogen or methyl and $R_2$ is alkyl of 1 to 11 carbon atoms, hydroxyethylmethacrylate, hydroxyethylacrylate, hydroxypropylmethacrylate, hydroxypropylacrylate, acrylamide, N-methylolacrylamide, N-methylolmethacrylamide, N-methylolacrylamide butyl ether and styrene.

2. A method for improving emulsion paint as claimed in claim 1, in which said emulsion paint is acrylic resin type, polyvinyl acetate type or styrene-butadiene copolymer type emulsion paint.

3. A method for improving emulsion paint as claimed in claim 1, in which said ethylenically unsaturated monomer having at least one carboxyl group is acrylic acid, methacrylic acid or itaconic acid.

4. A method for improving emulsion paint as claimed in claim 1, in which 5 to 25 N,N-diethylaminoethylmethacrylate, by weight as solid of said aqueous acrylic carboxyl solution is added to 100 parts by weight as resin solid of said emulsion paint.

5. A method for improving emulsion paint as claimed in claim 1 wherein said tertiary amine containing ethylenically unsaturated monomer is N,N-deithylaminoethylmethacrylate, said ethylenically unsaturated monomer having at least one carboxy group is acrylic acid, and said other ethylenically unsaturated monomer is a mixture of styrene, laurylmethacrylate and hydroxypropylmethacrylate.

6. A method for improving emulsion paint as claimed in claim 1 in which said tertiary amine containing ethylenically unsaturated monomer is N, N-diethylaminoethylacrylate, said ethylenically unsaturated monomer having at least one carboxyl group is acrylic acid and said other ethylenically unsaturated monomer is a mixture of styrene, laurylmethacrylate and acrylamide.

7. A method for improving emulsion paint as claimed in claim 1 wherein said tertiary amine containing ethylenically unsaturated monomer is N, N-diethylaminoethylmethacrylate, said ethylenically unsaturated monomer containing at least one carboxyl group is acrylic acid and said other ethylenically unsaturated monomer is a mixture of N-methylolacrylamide, methylmethacrylate and n-butylacrylate.

8. An emulsion paint containing, as an additive therefore, 1 to 40 parts by weight as solids per 100 parts by weight of resin solids of said emulsion paint of an aqueous acrylic resin solution of ingredients comprising from 1 to 20 weight percent of at least one tertiary amine containing ethylenically unsaturated monomer selected from the group consisting of N,N-dimethylaminoethylacrylate, N,N-dimethylaminoethylmethacrylate, N,N-diethylaminoethylacrylate and N, N-diethylaminoethylmethacrylate, 5 to 20 weight percent of ethylenically unsaturated monomer having at least one carboxyl group, and 60 to 94 weight percent of another ethylenically unsaturated mononer which is at least one member of the group of acrylic or methacrylic ester of the formula:

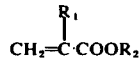

in which $R_1$ is hydrogen or methyl and $R_2$ is alkyl of 1 to 11 carbon atoms, hydroxyethylmethacrylate, hydroxyethylacrylate, hydroxypropylmethacrylate, hydroxypropylacrylate, acrylamide, N-methylolacrylamide, N-methylolmethacrylamide, N-methylolacrylamide butyl ether and styrene.

9. The emulsion paint of claim 8 containing 5 to 25 parts by weight of said additive per 100 parts of resin solids.

* * * * *

UNITED STATES PATENT AND TRADEMARK OFFICE
CERTIFICATE OF CORRECTION

PATENT NO. : 3,985,698
DATED : October 12, 1976
INVENTOR(S) : Tadashi Matsudaira et al It is certified that error appears in the above-identified patent and that said Letters Patent are hereby corrected as shown below:

Column 7, lines 26-27, for "N,N-diethylaminoethylmethacrylate" read --parts--; line 28, for "carboxyl" read --resin--.

Signed and Sealed this

First Day of February 1977

[SEAL]

Attest:

RUTH C. MASON
*Attesting Officer*

C. MARSHALL DANN
*Commissioner of Patents and Trademarks*